United States Patent
Reddy (10) Patent No.: US 8,165,077 B2
(45) Date of Patent: Apr. 24, 2012

(54) DELEGATION OF MOBILE COMMUNICATION TO EXTERNAL DEVICE

(75) Inventor: Nagareddy S. Reddy, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 750 days.

(21) Appl. No.: 12/239,255

(22) Filed: Sep. 26, 2008

(65) Prior Publication Data

US 2010/0081440 A1    Apr. 1, 2010

(51) Int. Cl.
*H04Q 7/00* (2006.01)
(52) U.S. Cl. .......................... 370/329; 370/338
(58) Field of Classification Search .................. 370/328, 370/329, 336, 338, 345, 401, 465
See application file for complete search history.

(56) References Cited

U.S. PATENT DOCUMENTS

| | | | |
|---|---|---|---|
| 6,216,004 B1 * | 4/2001 | Tiedemann et al. | 455/442 |
| 7,113,911 B2 * | 9/2006 | Hinde et al. | 704/270.1 |
| 7,269,629 B2 * | 9/2007 | Zmudzinski et al. | 709/207 |
| 7,349,355 B2 * | 3/2008 | Sengupta et al. | 370/311 |
| 7,496,112 B1 * | 2/2009 | Danielson et al. | 370/468 |
| 7,512,708 B2 * | 3/2009 | Read | 709/245 |
| 7,835,372 B2 * | 11/2010 | Wang et al. | 370/401 |
| 7,852,794 B2 * | 12/2010 | Venkatachalam | 370/312 |
| 2005/0141464 A1 | 6/2005 | Willey et al. | |
| 2005/0286466 A1 | 12/2005 | Tagg et al. | |
| 2006/0025181 A1 | 2/2006 | Kalofonos et al. | |
| 2008/0267144 A1 * | 10/2008 | Jano et al. | 370/338 |
| 2009/0221303 A1 * | 9/2009 | Soliman | 455/458 |

OTHER PUBLICATIONS

Klamra, et al., "Design and Evaluation of Power Management Support for UPnP Devices", A Master's Thesis, Department of Communication Systems, Lund Institute of Technology, Dated: Jun. 10, 2005, pp. 1-80.
Shenoy, et al., "Proxy-Assisted Power-Friendly Streaming to Mobile Devices", In MMCN Conference ,2003, pp. 177-191.
Albrecht, et al., "IP Services over Bluetooth: Leading the Way to a New Mobility", Conference on Local Computer Networks, 1999. LCN apos;99, Date: Oct. 1999, pp. 2-11.
Yao, Paul, "Power Management Features of Windows CE .NET", Date: Aug. 2002, http://msdn.microsoft.com/en-us/library/ms836788.aspx.
Shen, et al., "Using Application Specific Information to Save Energy Consumption by Network Activities in Pocket PC", Department of Electrical Engineering and Computer Science, University of Michigan, Retrieved on Aug. 5, 2008, 9 Pages.

* cited by examiner

*Primary Examiner* — Ricky Ngo
*Assistant Examiner* — Christine Ng (57) ABSTRACT

Delegating voice and/or data traffic communication from a mobile computing device to an external proxy device. The mobile computing device obtains identification of a traffic channel and a time slot and provides the information to the proxy device. The proxy device monitors a cellular network on the identified traffic channel during the identified time slot while the mobile computing device goes into signaling mode. The proxy device exchanges voice and/or data traffic between the user and the cellular network In some embodiments, the proxy device includes a speaker and microphone. In other embodiments, the proxy device sends the voice and/or data traffic to the user via the mobile computing device or another device. By delegating the voice and/or data traffic communication to the proxy device, the battery life of the mobile computing device is preserved.

15 Claims, 5 Drawing Sheets

DELEGATION OF MOBILE COMMUNICATION TO EXTERNAL DEVICE

BACKGROUND

Most mobile computing devices use a cellular radio for communication. Use of the radio absorbs power and diminishes battery life on the mobile computing device. In existing systems, the mobile computing device is responsible for both signaling (e.g., call setup and maintenance) and bearer communication (voice and/or data communication). The bearer communication is responsible for most of the power expense associated with a call. That is, the voice transmit and receive operations consume a significant amount of battery power. Even when the mobile computing device is attached to an external power source, the rate of usage or drain exceeds the rate of charging.

SUMMARY

Embodiments of the invention delegate voice and/or data traffic communication from a mobile computing device to a proxy device. The mobile computing device identifies a traffic channel and a time slot to the proxy device. The proxy device monitors a cellular network using the identified traffic channel and time slot. The proxy device exchanges the voice and/or data traffic between a user and the cellular network on behalf of the mobile computing device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, embodiments of the invention delegate communication with a traffic channel 122 of a cellular network 108 from a mobile computing device 104 to a proxy device 106. In some embodiments, the proxy device 106 handles voice and/or data traffic communication while the mobile computing device 104 is in signaling mode. Aspects of the invention reduce the power consumption of the mobile computing device 104 thus preserving battery life. In an example, the mobile computing device 104 is a mobile telephone 502 and the proxy device 106 is a radio frequency enabled mobile voice proxy 504. The mobile voice proxy 504 is external to the mobile telephone 502, and has a different power source than the mobile telephone 502. Some estimates indicate that 2% of the battery power consumed during a call is for call setup and maintenance, while 98% of the battery power consumed during the call is for transmitting and receiving voice data.

While aspects of the invention are described with reference to the mobile computing device 104 such as the mobile telephone 502, embodiments of the invention are operable with any communication device associated with a user 102. For example, aspects of the invention are operable with devices such as laptop computers, gaming consoles, hand-held or vehicle-mounted navigation devices, portable music players, and other devices. Further, while aspects of the invention are described with reference to the cellular network 108, embodiments of the invention are operable with any network.

Referring again to FIG. 1, an exemplary block diagram illustrates communication between the user 102, the mobile computing device 104, the proxy device 106, and the cellular network 108. The user 102 interacts with the mobile computing device 104 to place a call, terminate a call, or perform other call setup or configuration operations. The mobile computing device 104 communicates with a paging channel 120 of the cellular network 108 to implement the call setup or configuration operations. Once the call has been established, the mobile computing device 104 delegates the voice data or audio data transmit and receive operations to the proxy device 106. The proxy device 106 communicates with the traffic channel 122 of the cellular network 108 to perform the voice data transmit and receive operations. The traffic channel 122 represents one of a plurality of traffic channels available in the cellular network 108. The proxy device 106 provides the voice data to a rendering device 110 for presentation to the user 102. For example, the rendering device 110 corresponds to an audio device having at least one speaker 116 for producing the voice data to the user 102 as audible sound. The rendering device 110 also includes at least one microphone 118 to capture voice data generated by the user 102 and send the captured voice data to the proxy device 106 for delivery to the traffic channel 122 on the cellular network 108. The rendering device 110 may include both the speaker 116 and microphone 118, or just one or the other. Similarly, the proxy device 106 may include both the speaker 112 and microphone 114, or just one or the other.

Figure 1:
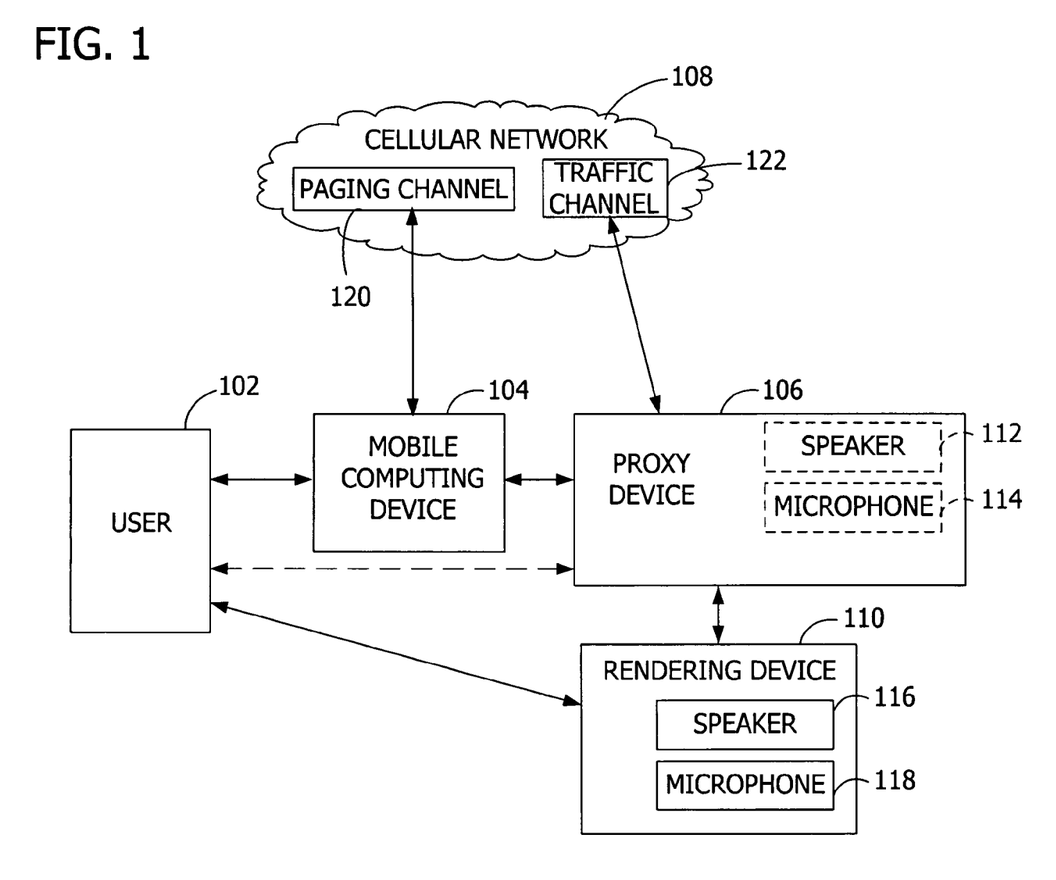
FIG. 1 is an exemplary block diagram illustrating communication between a mobile computing device, a proxy device, and a cellular network.

The rendering device 110 may be connected to the proxy device 106 in various ways. For example, the rendering device 110 may communicate with the proxy device 106 wirelessly via radio frequency transmissions such as by BLUETOOTH brand wireless communication devices or in conformance with any of the 802.11 standards. Alternatively or in addition, the rendering device 110 may be connected to the proxy device 106 via a physical wired connection such as by a common speaker wire. Further, the rendering device 110 may be connected to the proxy device 106 via a network such as the Internet, or via other connections such as a universal serial bus.

Similarly, the mobile computing device 104 may be connected, yet separated from, to the proxy device 106 in various ways. For example, the mobile computing device 104 may communicate with the proxy device 106 wirelessly via radio frequency transmissions such as by BLUETOOTH brand wireless communication devices or in conformance with any of the 802.11 standards. Alternatively or in addition, the mobile computing device 104 may be connected to the proxy device 106 via a physical wired connection. Further, the mobile computing device 104 may be connected to the proxy device 106 via a network such as the Internet, or via other connections such as a universal serial bus. In general, the connection between the mobile computing device 104 and the proxy device 106 is a low-power connection. That is, performing transmit and receive operations for the connection requires less battery power from the mobile computing device 104 than communication by the mobile computing device 104 with the cellular network 108.

In some embodiments in which there is no rendering device 110, the proxy device 106 includes the speaker 112 and the microphone 114 for producing and receiving data. The user 102 exchanges voice data with the proxy device 106 (as shown by the dashed line in FIG. 1).

In still other embodiments (not shown), the data received by the proxy device 106 from the cellular network 108 is provided to the mobile computing device 104 for playback on a speaker of the mobile computing device 104. Further, a microphone associated with the mobile computing device 104 captures voice data from the user 102. The mobile computing device 104 provides the captured voice data to the proxy device 106, where the proxy device 106 transmits the voice data to the cellular network 108.

The mobile computing device 104 includes an interface enabling the user 102 to select the speaker and microphone to use for a particular call, in some embodiments. For example, the user 102 selects the speaker 116 on the rendering device 110 (e.g., through the car stereo system) while selecting the microphone on a hands-free wireless earpiece (e.g., the rendering device 110). Appendix A lists exemplary messages sent responsive to the user 102 selecting the speaker and microphone for a particular call.

Figure 2:
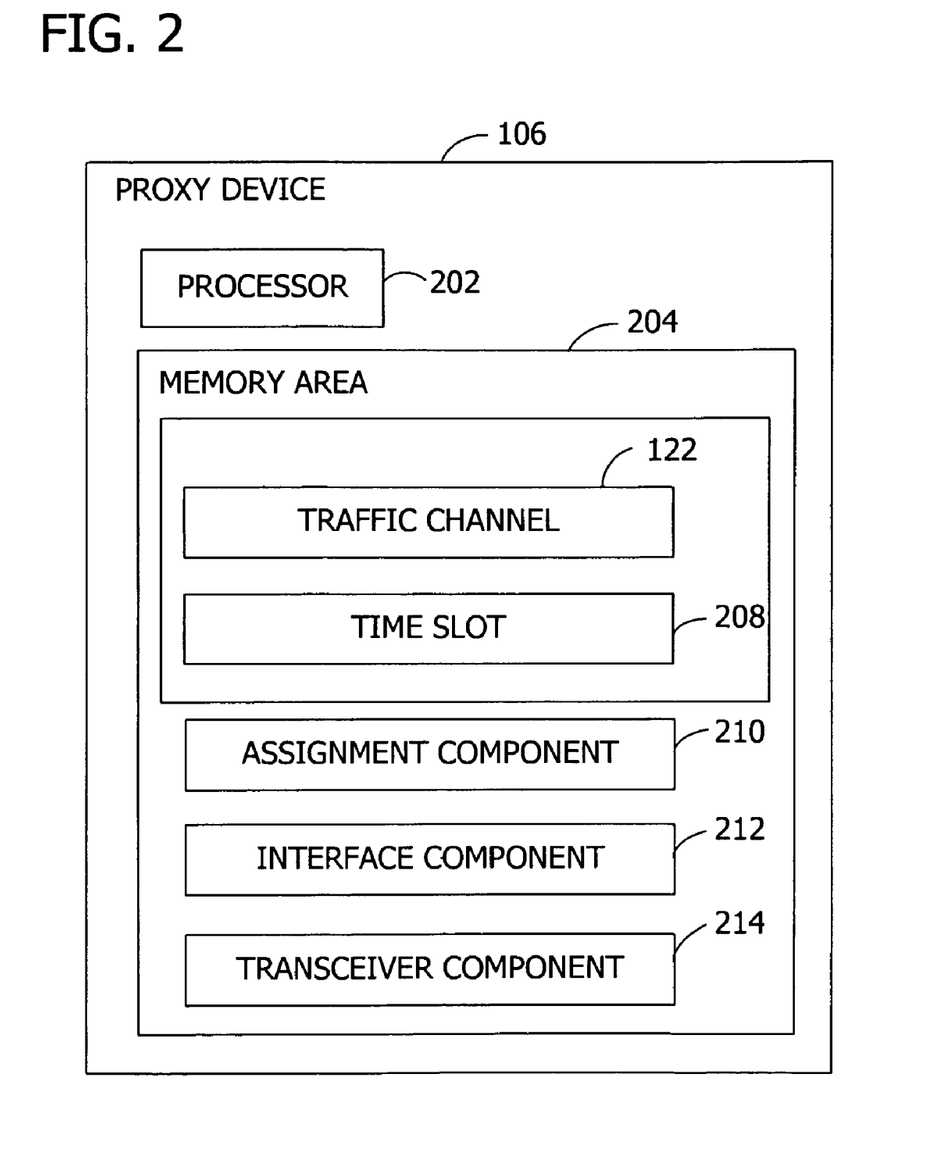
FIG. 2 is an exemplary block diagram of the proxy device storing computer-executable components for communicating with the cellular network.

Referring next to FIG. 2, an exemplary block diagram illustrates the proxy device 106 storing computer-executable components for communicating with the cellular network 108. The proxy device 106 includes a processor 202 and a memory area 204. The memory area 204 stores the assigned traffic channel 122 and an assigned time slot 208 associated with a call involving the user 102 and the cellular network 108. In the example of FIG. 2, the assigned traffic channel 122 and assigned time slot 208 correspond to a unidirectional connection (e.g., either transmit to or receive from the cellular network 108). For a bidirectional connection (e.g., in which data is both transmitted to and received from the cellular network 108), a separate traffic channel and time slot assigned is stored (not shown).

The memory area 204 also stores one or more computer-executable components such as an assignment component 210, an interface component 212, and a transceiver component 214. In the example of FIG. 2, the assignment component 210, the interface component 212, and the transceiver component 214 are executed by the processor 202 on the proxy device 106. The assignment component 210 receives, from the mobile computing device 104, identification of the traffic channel 122 and the time slot 208. The identified traffic channel 122 and time slot 208 are associated with a connection between the mobile computing device 104 and the cellular network 108. The connection corresponds to, for example, a mobile telephone call between the user 102 and another entity. The connection may also correspond to a web data connection or any other non-voice connection. For example, the user 102 may be browsing files on a network (e.g., involving web data), sending and receiving electronic mail or text or instant messages (e.g., involving messaging data), or viewing images or video (e.g., involving web data).

The interface component 212 receives data (e.g., first data or first voice data) such as voice data, web data, or any other data from the cellular network 108 on the identified traffic channel 122 during the identified time slot 208. The transceiver component 214 (e.g., software for a wireless network interface) transmits the received data from the proxy device 106 to the mobile computing device 104 or to the rendering device 110 to provide the received data to the user 102. The transceiver component 214 receives, by the proxy device 106, other data (e.g., second data or second voice data) from the mobile computing device 104 or the rendering device 110. The other data originates from the user 102 and includes, for example, a response to the data provided to the user 102. The interface component 212 transmits this other data to the cellular network 108 on the identified traffic channel 122 during the identified time slot 208. In this manner, the proxy device 106 performs the power-expensive transmit and receive operations for the voice data or other traffic data without involving the mobile computing device 104. In some embodiments, the mobile computing device 104 is in signaling mode while the proxy device 106 performs the transmit and receive operations for the call.

In an embodiment, the transceiver component 214 transmits received web data from the proxy device 106 to the mobile computing device 104 for display in a web browser on the mobile computing device 104.

Figure 3:
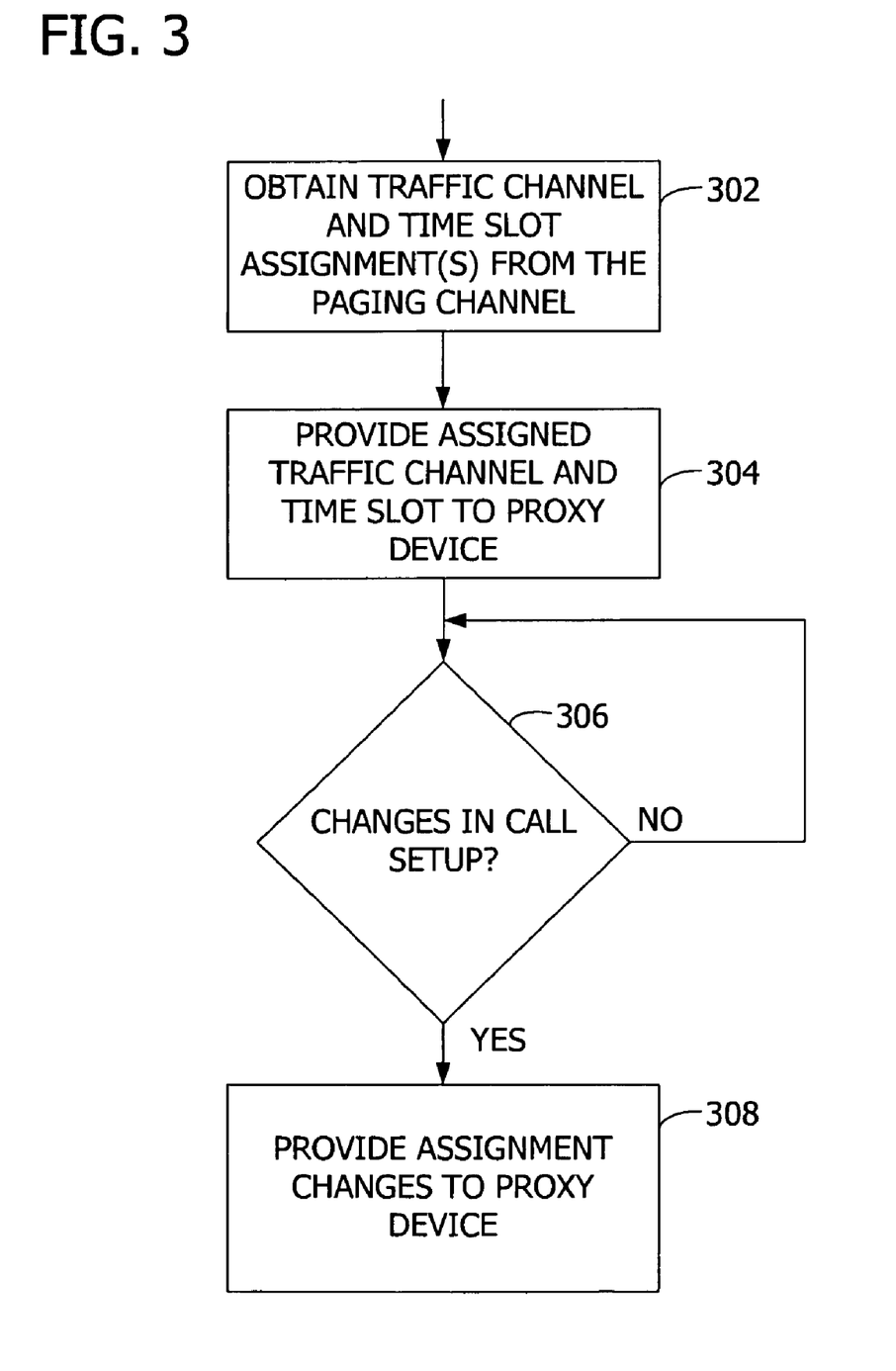
FIG. 3 is an exemplary flow chart illustrating operation of the mobile computing device to delegate voice and/or data traffic communication to the proxy device.

Referring next to FIG. 3, an exemplary flow chart illustrates operation of the mobile computing device 104 to delegate voice and/or data traffic communication to the proxy device 106. The operations illustrated in FIG. 3 are performed by the mobile computing device 104, or other device assisting the mobile computing device 104. At 302, the mobile computing device 104 obtains, negotiates, or otherwise receives the assigned traffic channel 122 and the assigned time slot 208 from the paging channel 120. The assigned traffic channel 122 and the assigned time slot 208 are provided at 304 by the mobile computing device 104 to the proxy device 106. Appendix A lists exemplary messages for conveying the assigned traffic channel 122 and the assigned time slot 208 from the mobile computing device 104 to the proxy device 106.

The proxy device 106 then manages the voice and/or data traffic exchanges with the cellular network 108 for this particular connection. For example, the proxy device 106 exchanges data between the user 102 and the cellular network 108 on the assigned traffic channel 122 during the assigned time slot 208 on behalf of the mobile computing device 104. At the same time, the mobile computing device 104 enters into, or remains in, a signaling mode to monitor the paging channel 120 for changes to the connection such the connection setup or configuration. For example, as the mobile computing device 104 exits the range of a particular cell and enters the range of another cell, the traffic channel 122 and time slot 208 assignments may change. In another example, the mobile computing device 104 may be informed by the paging channel 120 or other control channel of a call waiting. If there are changes in the call setup at 306, the assignment changes are identified or provided at 308 by the mobile computing device 104 to the proxy device 106. The proxy device 106 modifies communication with the cellular network 108 based on the provided changes.

Figure 4:
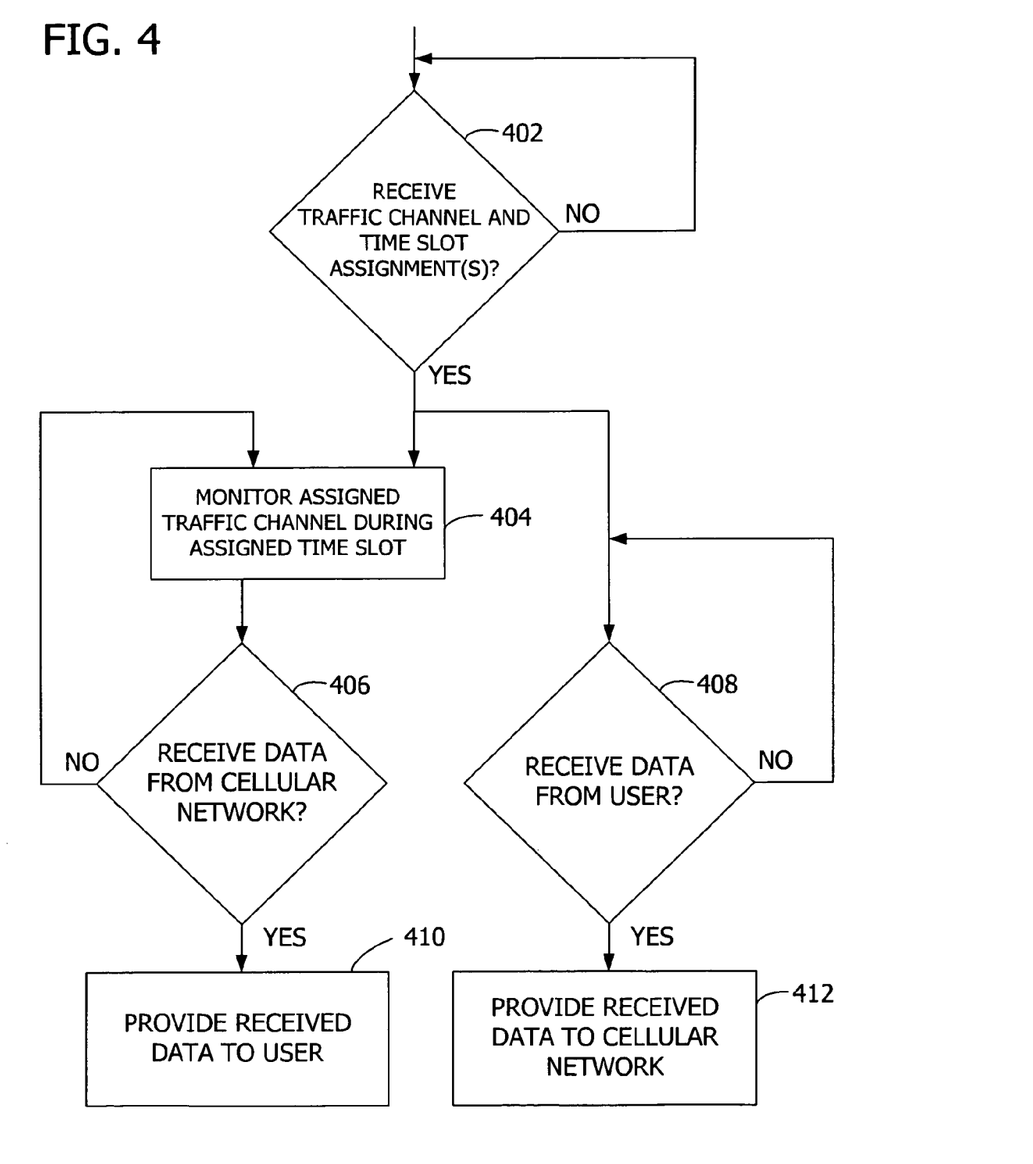
FIG. 4 is an exemplary flow chart illustrating operation of the proxy device in exchanging voice and/or data traffic communication between a user and the cellular network.

Referring next to FIG. 4, an exemplary flow chart illustrates operation of the proxy device 106 in exchanging voice and/or data traffic communication between the user 102 and the cellular network 108. The operations illustrated in FIG. 4 are performed by the proxy device 106 or other device assisting the proxy device 106. If the proxy device 106 receives at 402 the assigned traffic channel 122 and the assigned time slot 208 (e.g., from the mobile computing device 104), the proxy device 106 monitors at 404 the assigned channel on the cellular network 108 during the assigned time slot 208. Simultaneously or near simultaneously, the proxy device 106 monitors the microphone 114 or 118 for voice input from the user 102, or listens for input from the mobile computing device 104 if the connection is for web data (e.g., listens for a request for a web page).

If data is available from the cellular network 108, the proxy device 106 requests and receives at 406 the available data from the cellular network 108. The received data is provided at 410 to the user 102, exclusive of the mobile computing device 104. The mobile computing device 104 is not included in the transmission of the received data from the proxy device 106 to the user 102, in an embodiment. If the received data is voice data, the voice data is presented by the proxy device 106 to the user 102 via the speaker 112 or provided to the rendering device 110 for presentation to the user 102 via the speaker 116.

If data is available from the user 102, the proxy device 106 receives the data at 408 and provides the received data at 412 to the cellular network 108.

Figure 5:
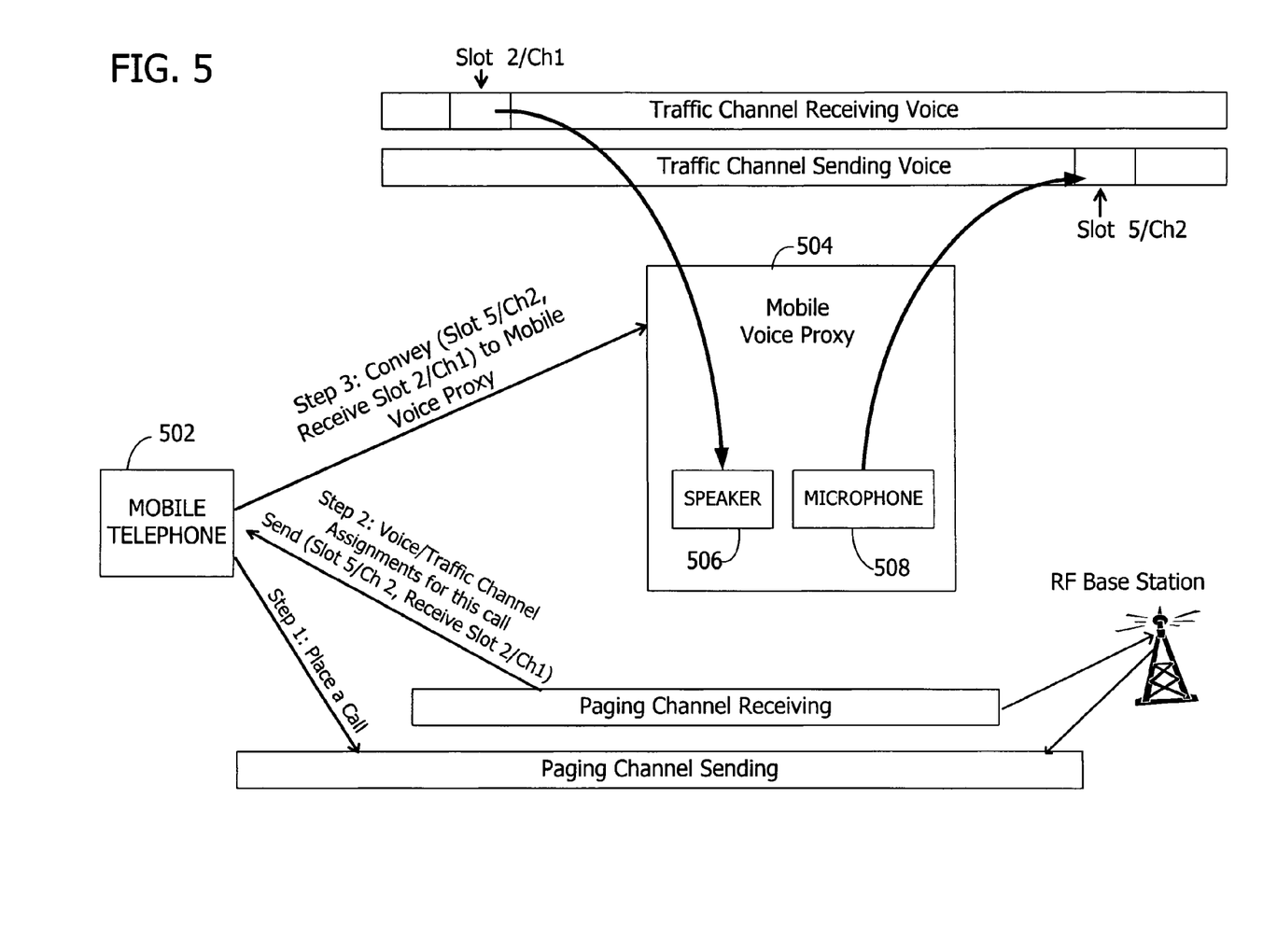
FIG. 5 is an exemplary block diagram illustrating a mobile telephone delegating voice traffic communication to a mobile voice proxy.

Referring next to FIG. 5, an exemplary block diagram illustrates the mobile telephone 502 delegating voice traffic communication to the mobile voice proxy 504. The steps and the ordering thereof as illustrated in FIG. 5 are merely exemplary for describing the communication flow in the example of FIG. 5. Other ordering, composition, division, or operations associated with each of the steps are contemplated.

The mobile telephone 502 places a call or receives notification of an incoming call from the paging channel 120. The paging channel 120 provides the traffic channels and time slots assigned to the call. In this example, the traffic channel and time slot for sending data to the cellular network 108 is Channel 2 and Slot 5. The traffic channel and time slot for receiving data from the cellular network 108 is Channel 1 and Slot 2. The channel/slot assignments are provided or conveyed from the mobile computing device 104 to the mobile voice proxy 504. The mobile voice proxy 504 proceeds to monitor at least one traffic channel using the provided channel/slot assignments. As data is received by the mobile voice proxy 504 from the traffic channel, the received data is rendered, produced, presented, or otherwise provided to the user 102 (e.g., via speaker 506). The mobile voice proxy 504 also provides data from a microphone 508 to the traffic channel.

EXAMPLES

In an example, the proxy device 106 is mounted in a vehicle in which the user 102 is traveling. The proxy device 106 is connected to a power source other than the power source of the mobile computing device 104. In this example, the proxy device 106 is connected to the vehicle battery. A hands-free microphone and speaker are either integrated into the proxy device 106 or included in the rendering device 110. The user 102 places a call with the mobile computing device 104. The proxy device 106 performs the voice data transmit and receive operations with the cellular network 108. The hands-free microphone and speaker exchange the voice data with the user 102 and the proxy device 106. The life of the battery in the mobile computing device 104 is preserved.

In another example, a plurality of proxy devices is installed in an office building. The user 102 is one of a plurality of users in the building. The proxy devices perform the voice data transmit and receive operations to reduce the power consumption of the batteries in the mobile computing devices of the users.

Exemplary Operating Environment

By way of example and not limitation, computer readable media comprise computer storage media and communication media. Computer storage media store information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

Although described in connection with an exemplary computing system environment, embodiments of the invention are operational with numerous other general purpose or special purpose computing system environments or configurations. Examples of well known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

The embodiments illustrated and described herein as well as embodiments not specifically described herein but within the scope of aspects of the invention constitute exemplary means for delegating an exchange of voice data associated with the call, where the delegation occurs from the mobile computing device 104 to the proxy device 106.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

APPENDIX A

Listed below are exemplary call setup an update messages exchanged between the mobile computing device 104 and the proxy device 106.

TABLE A1

Exemplary Call Setup and Update Messages.

| MESSAGE | DIRECTION | PURPOSE |
| --- | --- | --- |
| CALL_START_MSG | From mobile computing device to proxy device | To communicate call setup information such as traffic channel information for voice data, default audio device (e.g., phone/car kit/hands-free device) |
| CALL_START_ACK | From proxy device to mobile computing device | Acknowledge success or failure, selected audio device type and address. Default audio device is the mobile computing device. |
| CALL_TRAFFIC_CHANNEL_UPDATE | From mobile computing device to proxy device | Update of traffic channel info when mobile computing device is moving from one cell to another |
| CALL_TRAFFIC_CHANNEL_UPDATE_ACK | From proxy device to mobile computing device | Acknowledge success or failure |

Listed below are exemplary messages for selecting a speaker and microphone to use for a call, responsive to selection by the user 102.

TABLE A2

Exemplary Messages for Selecting Speaker and Microphone.

| MESSAGE | DIRECTION | PURPOSE |
| --- | --- | --- |
| GET_AUDIO_DEV_LIST | From mobile computing device to proxy device | Get the list of audio input/output capable devices. Example: Hands-free headset, car kit, and mobile computing device. These devices are capable of getting audio data from the proxy device directly. |
| GET_AUDIO_DEV_LIST_ACK | From proxy device to mobile computing device | List of audio capable devices connected to the proxy device including a list of type of audio device (e.g., hands-free headset, car kit, and mobile computing device) and an audio device address (e.g., unique address) |
| SET_AUDIO_DEVICE | From mobile computing device to | Mobile computing device tells proxy device to route acquired voice data from cell phone network to the mentioned device using the unique address of the audio device. |
| SET_AUDIO_DEVICE_ACK | From proxy device to mobile computing device | Acknowledge success or failure |

What is claimed is:

1. A system for communication with a cellular network by a proxy device separate from a mobile computing device to preserve battery life on the mobile computing device, said cellular network having one or more traffic channels and one or more paging channels, said system comprising:
a memory area for storing an assignment of at least one traffic channel and at least one time slot; and
a processor programmed to:
receive, by a proxy device from a mobile computing device, identification of the traffic channel and the time slot, said identified traffic channel and time slot being associated with a connection between the mobile computing device and the cellular network, said proxy device and said mobile computing device being associated with a user;
monitor the cellular network on the identified traffic channel during the identified time slot;
receive first data from the cellular network on the identified traffic channel during the identified time slot;
provide, by the proxy device responsive to the received first data and without communicating with the mobile computing device, the received first data to the user;
receive, by the proxy device, second data from the user; and
transmit the received second data to the cellular network on the identified traffic channel during the identified time slot.

2. The system of claim 1, wherein the processor is programmed to receive the first data by receiving one or more of the following: audio data, video data, web data, and messaging data.

3. The system of claim 1, further comprising means for delegating an exchange of voice data associated with a call, said delegation occurring from the mobile computing device to the proxy device.

4. The system of claim 1, wherein the mobile computing device comprises a mobile telephone, and wherein the proxy device comprises a mobile voice proxy.

5. The system of claim 1, wherein the proxy device comprises a radio frequency enabled device for receiving the identification of the traffic channel and the time slot from the mobile computing device.

6. The system of claim 1, wherein the first data comprises audio data, and wherein the processor is programmed to provide the received first data to the user by playing the audio through a speaker of the proxy device.

7. The system of claim 1, wherein the first data comprises audio data, and wherein the processor is programmed to provide the received first data to the user by playing the audio through a speaker associated with an audio device separate from the proxy device.

8. The system of claim 1, wherein the processor is programmed to provide the received first data to the user by providing the received first data to the user without waking the mobile computing device.

9. One or more computer storage media having computer-executable components, said components comprising:
- an assignment component for receiving, by a proxy device from a mobile computing device, identification of at least one traffic channel and at least one time slot, said identified traffic channel and time slot being associated with a connection between the mobile computing device and a cellular network, said proxy device and said mobile computing device being associated with a user;
- an interface component for receiving first data from the cellular network on the identified traffic channel during the identified time slot; and
- a transceiver component for transmitting, responsive to the received first data and without communicating with the mobile computing device, the received first data from the proxy device to a rendering device to provide the first data to the user, wherein the transceiver component receives, by the proxy device, second data from the mobile computing device or the rendering device, and wherein the interface component transmits the received second data to the cellular network on the identified traffic channel during the identified time slot.

10. The computer storage media of claim 9, wherein the second data comprises audio data, and wherein the transceiver component receives, via a microphone associated with the proxy device, the second data.

11. The computer storage media of claim 9, wherein the transceiver component comprises a wireless network interface.

12. The computer storage media of claim 9, wherein the mobile computing device is in signaling mode during execution of the interface component.

13. The computer storage media of claim 9, wherein the interface component receives voice data from the cellular network on the identified traffic channel during the identified time slot.

14. The computer storage media of claim 9, wherein the interface component receives web data from the cellular network on the identified traffic channel during the identified time slot.

15. The computer storage media of claim 14, wherein the transceiver component transmits the received web data from the proxy device to the mobile computing device for display in a web browser.

* * * * *